United States Patent [19]

Rinehart

[11] Patent Number: 6,010,155
[45] Date of Patent: *Jan. 4, 2000

[54] VEHICLE FRAME ASSEMBLY AND METHOD FOR MANUFACTURING SAME

[75] Inventor: Ronald A. Rinehart, Stevens, Pa.

[73] Assignee: Dana Corporation, Toledo, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/775,653

[22] Filed: Dec. 31, 1996

[51] Int. Cl.$^7$ .................................................. B62D 21/00
[52] U.S. Cl. ...................... 280/781; 280/797; 280/798; 280/800; 296/29
[58] Field of Search ...................... 280/797, 798, 280/800, 781, 785, 796, 799; 296/29, 204, 205; 29/897.2, 897.35; 52/735.1, 737.6

[56] References Cited

U.S. PATENT DOCUMENTS

| | | |
|---|---|---|
| 1,512,700 | 10/1924 | Lambert . |
| 1,629,278 | 5/1927 | Lambert . |
| 2,105,713 | 1/1938 | Werdehoff ................................ 280/797 |
| 2,788,223 | 4/1957 | Mersheimer et al. . |
| 2,809,050 | 10/1957 | Bauer . |
| 2,880,013 | 3/1959 | Dean . |
| 4,229,018 | 10/1980 | Chika . |
| 5,149,132 | 9/1992 | Ruehl et al. ............................ 280/800 |
| 5,308,115 | 5/1994 | Ruehl et al. ............................ 280/785 |
| 5,561,902 | 10/1996 | Jacobs et al. ........................... 280/800 |

FOREIGN PATENT DOCUMENTS

| | | | |
|---|---|---|---|
| 60-76477 | 4/1985 | Japan ..................................... 296/204 |
| 3-65475 | 3/1991 | Japan ..................................... 296/204 |
| 5-319304 | 12/1993 | Japan ....................................... 296/29 |
| 723878 | 2/1955 | United Kingdom .................... 296/29 |

*Primary Examiner*—Peter C. English
*Attorney, Agent, or Firm*—MacMillan, Sobanski & Todd, LLC

[57] ABSTRACT

A vehicle frame assembly includes a side rail formed from a first side rail member including an end portion having a closed cross sectional shape and a second side rail member including an end portion having an open cross sectional shape. The cross sectional shapes of the end portions of the first and second side rail members may be formed having either a rectilinear, circular, or other cross sectional shape. Preferably, the end portions of the first and second side rail members are formed having complementary cross sectional shapes. To form a joint between the first and second side rail members, the end portions thereof are arranged in a telescoping relationship. Then, the end portions are secured together, such as by welding. If desired, one or more notches may be formed in one of the side rail members to facilitate the welding process and to provide additional welding junctions between the first and second side rail sections.

19 Claims, 5 Drawing Sheets

VEHICLE FRAME ASSEMBLY AND METHOD FOR MANUFACTURING SAME

BACKGROUND OF THE INVENTION

This invention relates in general to frame assemblies for vehicles. In particular, this invention relates to a joint structure between a closed channel structural member and an open channel structural member in such a vehicle frame assembly, and to a method of manufacturing such a joint structure.

Virtually all land vehicles in common use, such as automobiles and trucks, include a frame which serves as a platform upon which the remainder of the vehicle is built. Many vehicle frame structures are known in the art. Most of these known vehicle frame structures are formed from a number of individual metallic components which are permanently joined together. For example, one type of vehicle frame structure is known as a full perimeter frame assembly. A typical full perimeter frame assembly is composed of a pair of longitudinally extending side rails which are joined together at the front by a forward cross member, at the rear by a rearward cross member, and at intermediate locations by one or more intermediate or auxiliary cross members. The cross members not only connect the two side rails together, but also provide desirable lateral and torsional rigidity to the vehicle frame assembly. The full perimeter frame assembly functions as a platform upon which the body and remaining components of the vehicle are supported.

Each of the side rails of the vehicle frame assembly may be formed either as a single individual structural member or as a plurality of individual structural members which are secured together. In shorter length vehicles, each of the side rails is usually formed from a single integral side rail member which extends the desired length. In longer length vehicles, however, each of the side rails is usually formed from two or more individual side rail members which are permanently joined together, such as by welding, to provide a unitary side rail which extends the desired length. In either instance, it is known to form the side rail members from either open or closed channel structural members. Open channel structural members can be characterized as having a non-continuous cross sectional shape, such as C-shaped or hat-shaped channel members, for example. Such open channel structural members are relatively easy and inexpensive to shape into desired configurations and to secure together. Closed channel structural members can be characterized as having a continuous cross sectional shape, such as tubular or box-shaped channel members, for example. Closed channel structural members are desirable because they are generally stronger and provide better torsional stiffness than open channel structural members of comparable weight.

One manufacturing process which is being increasingly used to manufacture closed channel structural members, including those used as vehicle side rail members, is the process of expansion shaping, commonly referred to as hydroforming. Hydroforming is a well known process which uses pressurized fluid to deform a tubular member into a desired shape. To accomplish this, the tubular member is initially disposed between two die sections of a hydroforming apparatus which, when closed together, define a die cavity having a desired final shape. Although the die cavity is usually somewhat larger than the tubular member itself and non-circular in cross sectional shape, the closure of the two die sections may, in some instances, cause some mechanical deformation of the tubular member. Thereafter, the tubular member is filled with a pressurized fluid, typically a relatively incompressible liquid such as water. The pressure of the fluid is increased to a magnitude where the tubular member is expanded outwardly into conformance with the die cavity. As a result, the tubular member is deformed into the desired final shape.

In a typical hydroforming apparatus, the ends of the tubular member extend outwardly from the die sections during the hydroforming process to facilitate the connection of sealing heads thereto. The sealing heads are provided to seal the interior of the tubular member to permit it to be filled with a pressurized fluid. One or both of the sealing heads is connected to a source of pressurized fluid for filling the tubular member with fluid and pressurizing such fluid to expand the portion of the tubular member contained between the die sections outwardly into conformance with the die cavity. As a result, the ends of the tubular member which extend outwardly from the die sections are not deformed during the hydroforming process and, therefore, are generally maintained in their original tubular shape. Thus, the hydroforming process results in a closed channel structural member having a non-circular cross sectional shape (box-shaped, for example) throughout most of its length, but includes end portions having a circular cross sectional shape.

As discussed above, it is desirable in some instances to form the side rail from two or more individual side rail members which are permanently joined together. In some instances, a first side rail member may terminate in an end portion having a closed channel cross sectional shape, while a second side rail member may terminate in an end portion having an open channel cross sectional shape. For example, if the first side rail member is formed by the above-described hydroforming process, the end portion thereof will normally have a circular cross sectional shape, while the second side rail member will normally have a rectilinear cross sectional shape. In the past, the circular cross section end portion of the first side rail member was removed in a trimming operation to facilitate the connection of the second side rail member (referred to herein as an extension member) thereto. The trimming operation provided mating end portions on the first and second side rail members which were complementary in shape (i.e., both rectilinear in cross sectional shape), thereby facilitating securement by welding or other means. Although effective, the trimming operation increased the cost of the vehicle frame assembly by increasing manufacturing operations and time, while creating undesirable scrap. Thus, it would be desirable to provide an improved method of joining a first closed channel side rail member with a second open channel side rail member which eliminates the need for such a trimming operation.

Additionally, it has been found that known welding processes for securing the closed channel side rail member to the open channel side rail member involve the use of relatively intricate welds on several mating surfaces. These mating surfaces include both interior and exterior surfaces of the two side rail members, making the welding process relatively difficult to perform quickly and efficiently. Thus, it would also be desirable to provide an improve method of joining a first closed channel side rail member to a second open channel side rail member by means of relatively quick and simple welding procedures.

SUMMARY OF THE INVENTION

This invention relates to a joint structure between a closed channel structural member and an open channel structural member in such a vehicle frame assembly, and to a method of manufacturing such a joint structure. The vehicle frame assembly includes a side rail formed from a first side rail member including an end portion having a closed cross sectional shape and a second side rail member including an end portion having an open cross sectional shape. The cross sectional shapes of the end portions of the first and second side rail members may be formed having either a rectilinear, circular, or other cross sectional shape. Preferably, the end portions of the first and second side rail members are formed having complementary cross sectional shapes. To form a joint between the first and second side rail members, the end portions thereof are arranged in a telescoping relationship. Then, the end portions are secured together, such as by welding. If desired, one or more notches may be formed in one of the side rail members to facilitate the welding process and to provide additional welding junctions between the first and second side rail sections.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
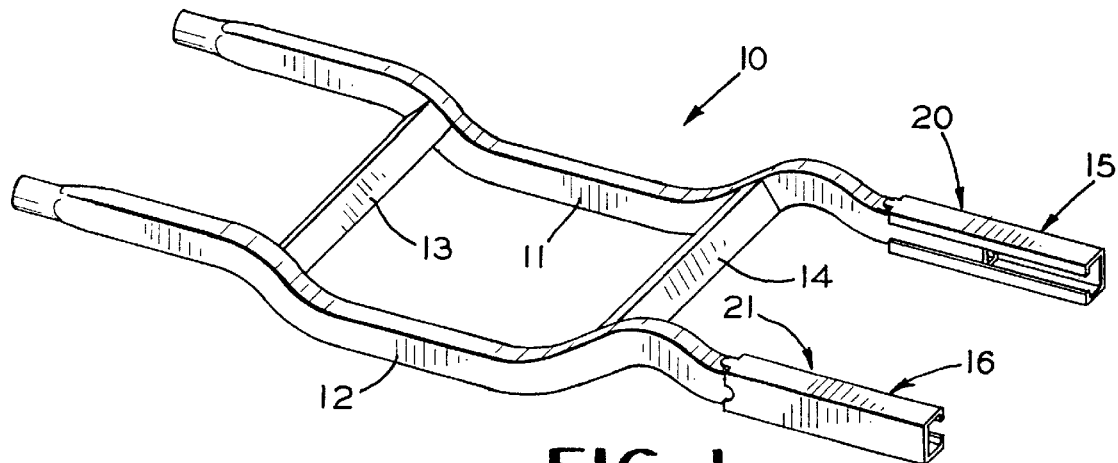
FIG. 1 is a perspective view of a vehicle frame assembly including a first embodiment of a pair of joint structures between closed channel side rail members having a rectilinear cross sectional shape and open channel extension members having a rectilinear cross sectional shape in accordance with this invention.

Referring now to the drawings, there is illustrated in FIG. 1 a vehicle frame assembly, indicated generally at 10, in accordance with a first embodiment of this invention. The illustrated vehicle frame assembly 10 includes a pair of longitudinally extending side rail members, such as the right and left side rails 11 and 12, which are connected together by a pair of transversely extending cross members, such as the forward cross member 13 and the rearward cross member 14. The terms "right", "left", "forward", and "rearward" and their derivatives are used herein only for the purpose of explanation and are not intended to be limiting in scope. The illustrated side rails 11 and 12 are both formed having a closed cross sectional shape, such as the illustrated hollow rectangular cross sectional shape. As used herein, the term "closed cross sectional shape" means a cross sectional shape which is fully continuous about the perimeter of the member, such as a tubular, box-shaped, or rectangular member. The side rails 11 and 12 are preferably formed from tubular steel stock using a conventional hydroforming process. However, the side rails 11 and 12 may be formed from any other acceptable material and manufacturing process. In the embodiment illustrated in FIGS. 1 through 4, the rearward end portions of the side rails 11 and 12 have been trimmed following the hydroforming process so as to terminate in respective box-shaped or rectilinear cross sectional shapes.

A pair of extension members, indicated generally at 15 and 16, are respectively secured to the rearward ends of the side rails 11 and 12. The illustrated extension members 15 and 16 are both formed having an open cross sectional shape, such as the illustrated C-shaped cross sectional shape. The term "open cross sectional shape" means a cross sectional shape which is not fully continuous about the perimeter of the member, such as a C-shaped or hat-shaped member. The extension members 15 and 16 are preferably formed from a sheet of steel stock using a conventional roll forming process. However, the extension members 15 and 16 may be formed from any other acceptable material and manufacturing process. In the embodiment illustrated in FIGS. 1 through 4, the forward end portions of the extension members 15 and 16 have respective box-shaped or rectilinear cross sectional shapes.

Figure 2:
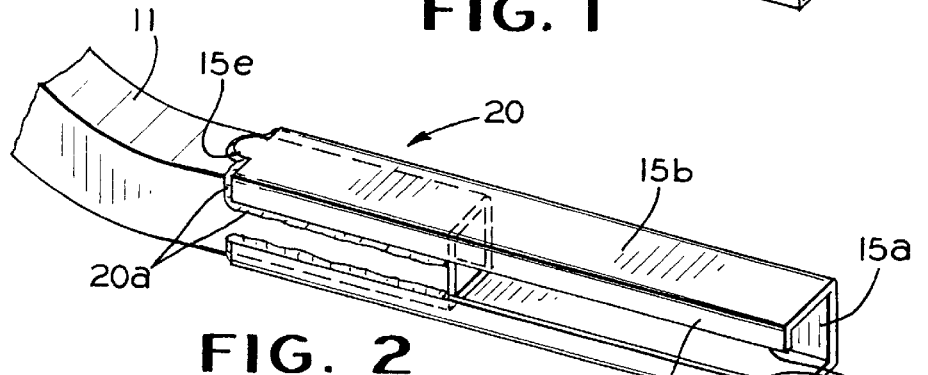
FIG. 2 is an enlarged perspective view of the inside portion of the right joint structure of the vehicle frame assembly illustrated in FIG. 1.
Figure 3:
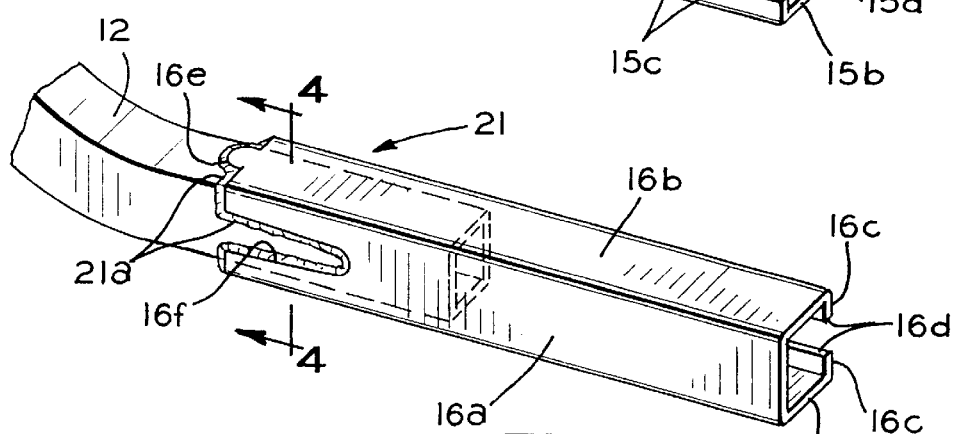
FIG. 3 is an enlarged perspective view of the outside portion of the left joint structure of the vehicle frame assembly illustrated in FIG. 1.

Referring to FIGS. 2 and 3, the illustrated C-shaped extension members 15 and 16 are formed having respective vertically extending web portions 15a and 16a, upper and lower horizontally extending flange portions 15b and 16b, and vertically extending lip portions 15c and 16c. The lip portions 15c and 16c terminate in respective spaced apart edges 15d and 16d. The forward edges of the upper horizontal flange portions 15b and 16b are formed having curved leading edges 15e and 16e, respectively, for a purpose which will be explained below. Similar curved leading edges (not shown) may be formed on the forward edges of the lower horizontal flange portions 15b and 16b. A notch 16f is formed in the forward edge of the vertically extending web portion 16a of the extension member 16. The notch 16f is generally U-shaped or V-shaped and extends rearwardly from the forward edge of the extension member 16. The notch 16f is provided for a purpose which will be explained below. A similar notch (not shown) may be formed in the forward edge of the vertically extending web portion 15a of the extension member 15.

Figure 4:
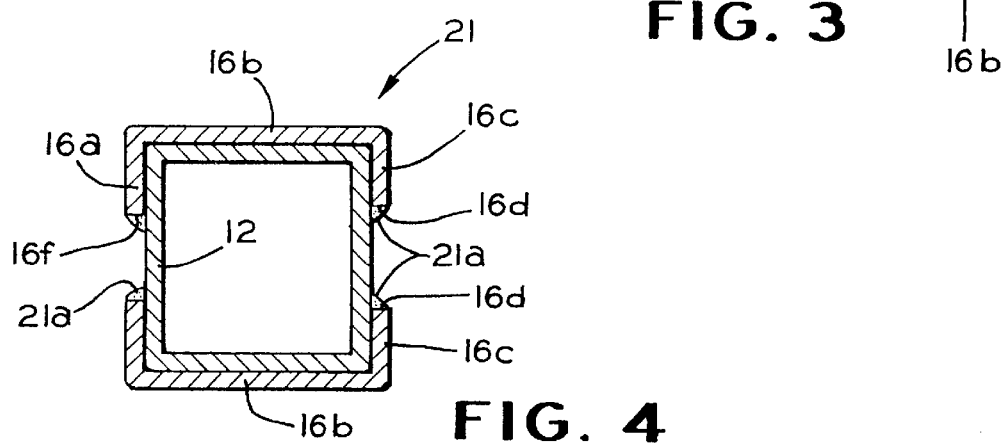
FIG. 4 is a sectional elevational view of the left joint structure taken along line 4—4 of FIG. 3.

The extension members 15 and 16 are secured to the side rails 11 and 12 at respective overlap joints, indicated generally at 20 and 21. As shown in FIGS. 2 through 4, the right overlap joint 20 is formed by disposing the extension member 15 telescopically about the side rail 11, while the left overlap joint 21 is formed by disposing the extension member 16 telescopically about the side rail 12. Inasmuch as the overlap joints 20 and 21 are mirror images of one another, the ensuing discussion will focus only on the left overlap joint 21 clearly illustrated in FIGS. 3 and 4. As shown therein, the curved leading edges 16e on the forward edge of the upper and lower horizontal flange portions 16b are provided to facilitate the insertion of the side rail 12 within the extension member 16. When assembled, the vertically extending web portion 16a of the extension member 16 is disposed parallel to and adjacent a first vertical side of the side rail 12. The upper and lower horizontally extending flange portions 16b of the extension member 16 are disposed parallel to and adjacent the upper and lower sides of the side rail 12. Lastly, the lip portions 16c of the extension member 16 are disposed parallel to and adjacent a second vertical side of the side rail 12.

Following this initial assembly, the extension member 16 is secured to the side rail 12 in a conventional manner, such as by welding. As shown in FIGS. 3 and 4, welds 21a can be formed along some or all of the adjacent edges of the extension member 16 and the side rail 12. Thus, the welds 21a can be formed along the vertically extending web portion 16a (including the notch 16f), the upper and lower horizontally extending flange portions 16b, and the spaced apart edges 16d of the lip portions 16c of the extension member 16. The welds 21a can be formed by any conventional welding apparatus and preferably extend about the entire extent of the extension member 16. However, if desired, the welds 21a need not extend continuously or completely about the entire extent of the extension member 16. Similar welds 20a can be formed along some or all of the adjacent edges of the extension member 15 and the side rail 11.

Figure 5:
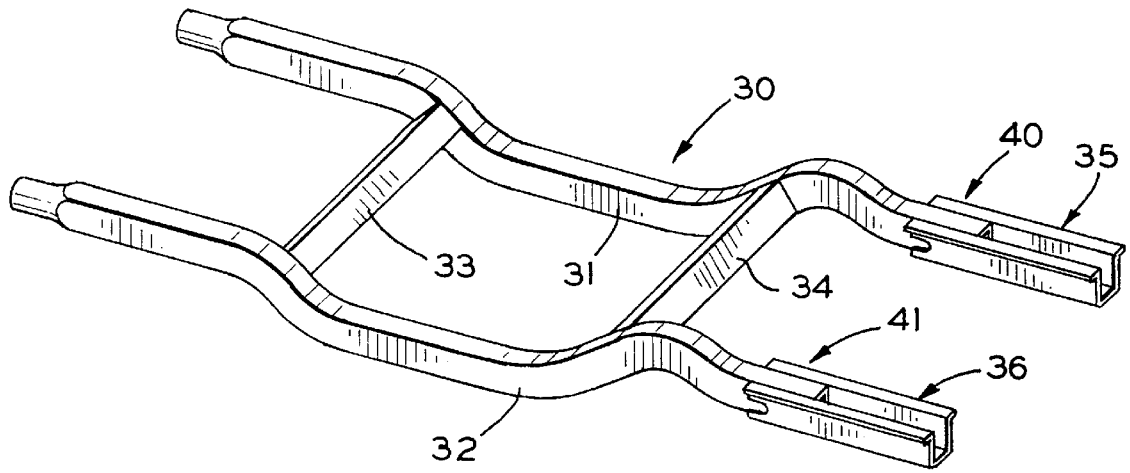
FIG. 5 is a perspective view of a vehicle frame assembly including a second embodiment of a pair of joint structures between closed channel side rail members having a rectilinear cross sectional shape and open channel extension members having a rectilinear cross sectional shape in accordance with this invention.
Figure 6:
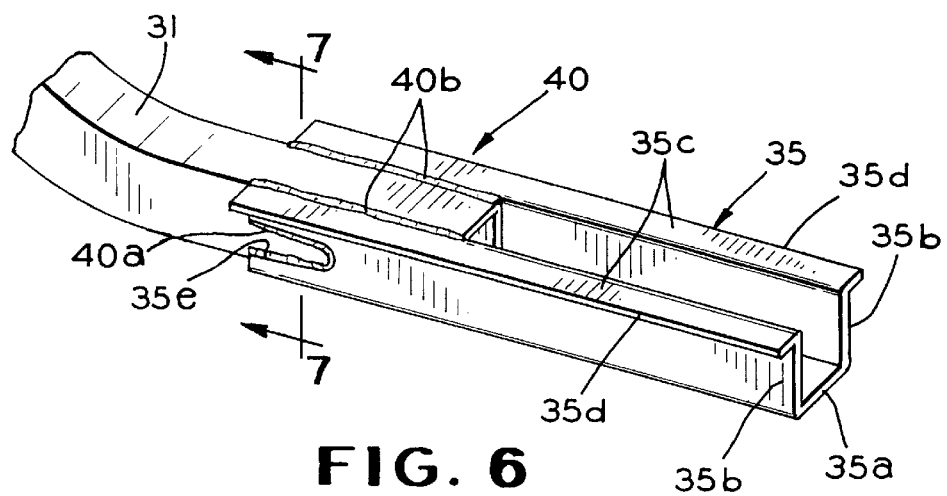
FIG. 6 is an enlarged perspective view of the inside portion of the right joint structure of the vehicle frame assembly illustrated in FIG. 5.
Figure 7:
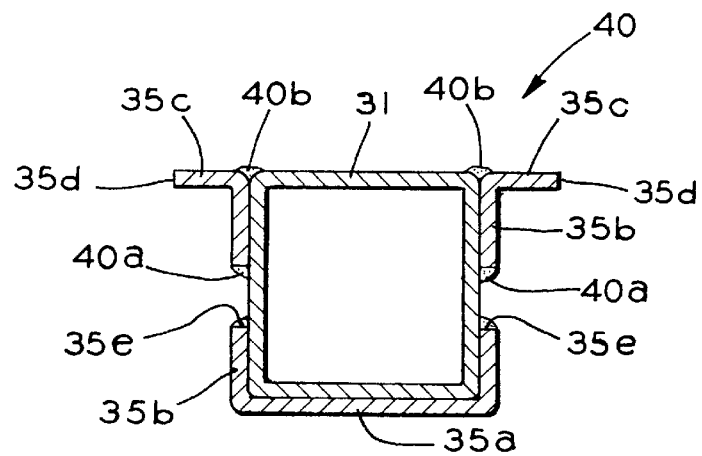
FIG. 7 is a sectional elevational view of the right joint structure taken along line 7—7 of FIG. 6.
Figure 8:
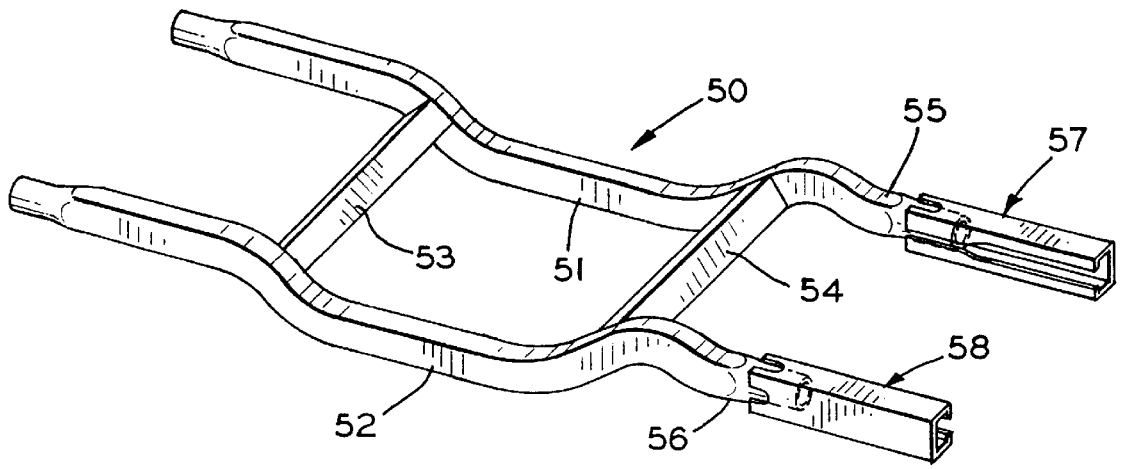
FIG. 8 is a perspective view of a vehicle frame assembly including a third embodiment of a pair of joint structures between closed channel side rail members having a circular cross sectional shape and open channel extension members having a rectilinear cross sectional shape in accordance with this invention.

Referring now to FIGS. 5 through 7, there is illustrated a portion of a vehicle frame assembly, indicated generally at 30, in accordance with a second embodiment of this invention. The illustrated vehicle frame assembly 30 includes a pair of longitudinally extending side rails 31 and 32 which are connected together by a pair of transversely extending cross members 33 and 34. The illustrated side rails 31 and 32 are both formed having a closed cross sectional shape, such as the illustrated hollow rectangular cross sectional shape. The side rails 31 and 32 are preferably formed from tubular steel stock using a conventional hydroforming process. However, the side rails 31 and 32 may be formed from any other acceptable material and manufacturing process. In the embodiment illustrated in FIGS. 5 through 7, the rearward end portions of the side rails 31 and 32 have been trimmed following the hydroforming process so as to terminate in respective box-shaped or rectilinear cross sectional shapes.

A pair of extension members, indicated generally at 35 and 36, are respectively secured to the ends of the side rails 31 and 32. The illustrated extension members 35 and 36 are both formed having an open cross sectional shape, such as the illustrated hat-shaped cross sectional shape. The extension members 35 and 36 are preferably formed from a sheet of steel stock using a conventional roll forming process. However, the extension members 35 and 36 may be formed from any other acceptable material and manufacturing process. In the embodiment illustrated in FIGS. 5 through 7, the forward end portions of the extension members 35 and 36 have respective box-shaped or rectilinear cross sectional shapes.

The hat-shaped extension member 35 is formed having a horizontally extending web portion 35a, a pair of vertically extending flange portions 35b, and a pair of lip portions 35c which extend horizontally outwardly away from one another and from the flange portions 35b. The lip portions 35c terminate in spaced apart edges 35d. A notch 35e is formed in the forward edge of each of the vertically extending flange portions 35b of the extension member 35. The notch 35e is generally U-shaped or V-shaped and extends rearwardly from the forward edge of the extension member 35. The notch 35e is provided for a purpose which will be explained below.

The extension members 35 and 36 are secured to the side rails 31 and 32 at respective overlap joints, indicated generally at 40 and 41. As shown in FIGS. 5 through 7, the right overlap joint 40 is formed by disposing the extension member 35 telescopically about the side rail 31, while the left overlap joint 41 is formed by disposing the extension member 36 telescopically about the side rail 32. Inasmuch as the overlap joints 40 and 41 are identical, the ensuing discussion will focus only on the right overlap joint 40 clearly illustrated in FIGS. 6 and 7. As shown therein, the overlap joint 40 is formed by installing the extension member 35 telescopically about the side rail 31. When assembled, the horizontally extending web portion 35a of the extension member 35 is disposed parallel to and adjacent the lower horizontal side of the side rail 31. The vertically extending flange portions 35b of the extension member 35 are disposed parallel to and adjacent the vertical sides of the side rail 31. Lastly, the lip portions 35c of the extension member 35 are disposed parallel to and extend outwardly from the upper horizontal side of the side rail 31.

Following this initial assembly, the extension member 35 is secured to the side rail 31 in a conventional manner, such as by welding. Welds 40a can be formed along some or all of the adjacent edges of the extension member 35 and the side rail 31. Thus, the welds 40a can be formed along the leading edge of the horizontally extending web portion 35a, the leading edges of the vertically extending flange portions 35b, and the notch 35e in each of the flange portions 35b. Additionally, welds 40b can be formed along the longitudinally extending upper adjacent edges of the side rail 31 and the extension member 35. The welds 40b extend along the junctions of the upper horizontal side of the side rail 31 with each of the two vertical sides thereof and along the adjacent junctions of the vertical flange portions 35b of the extension member 35 with the horizontal lip portions 35c thereof. The welds 40a and 40b can be formed by any conventional welding apparatus and preferably extend along and about the entire extent of the extension member 35. However, if desired, the welds 40a and 40b need not extend continuously or completely about the entire extent of the extension member 35.

Referring now to FIGS. 8 through 11, there is illustrated a portion of a vehicle frame assembly, indicated generally at 50, in accordance with a third embodiment of this invention. The illustrated vehicle frame assembly 50 includes a pair of longitudinally extending side rails 51 and 52 which are connected together by a pair of transversely extending cross members 53 and 54. The side rails 51 and 52 are preferably formed from tubular steel stock using a conventional hydroforming process. The central portions of the illustrated side rails 51 and 52 are formed having a rectilinear cross sectional shape. However, the end portions of the side rails 51 and 52 have not been trimmed off as described above and, therefore, have a circular cross sectional shape. However, the side rails 51 and 52 may be formed from any other acceptable material and manufacturing process.

A pair of extension members, indicated generally at 57 and 58, are respectively secured to the side rail end portions 55 and 56. The illustrated extension members 57 5 and 58 are both formed having an open cross sectional shape, such as the illustrated C-shaped cross sectional shape. The extension members 57 and 58 are preferably formed from a sheet of steel stock using a conventional roll forming process. However, the extension members 57 and 58 may be formed from any other acceptable material and manufacturing process. In the embodiment illustrated in FIGS. 8 through 11, the forward end portions of the extension members 57 and 58 have respective box-shaped or rectilinear cross sectional shapes.

The illustrated C-shaped extension members 57 and 58 are formed having respective vertically extending web portions 57a and 58a, upper and lower horizontally extending flange portions 57b and 58b, and lip portions 57c and 58c extending vertically inwardly toward one another from the flange portions 57b and 58b. The lip portions terminate in spaced apart edges 57d and 58d. The width of the lip portions 57c and 58c may vary along the length of the open section frame member 57 and 58 so that the distances between the spaced apart edges 57d and 58d decrease adjacent the forward ends of the extension members 57 and 58.

Notches 57e (only one is illustrated) are formed in the forward ends of the upper and lower horizontally extending flange portions 57b of the extension member 57. The notches 57e are generally U-shaped or V-shaped and extend rearwardly from the forward edges of the extension member 57. A similar notch (not shown) is formed in the forward end of the vertically extending web portion 57a of the extension member 57. Similarly, notches 58e are formed in the forward ends of the upper and lower horizontally extending flange portions 58b of the extension member 58. The notches 58e are generally U-shaped or V-shaped and extend rearwardly from the forward edges of the extension member 58. A similar notch 58f is formed in the forward end of the vertically extending web portion 58a of the extension member 58.

Figure 9:
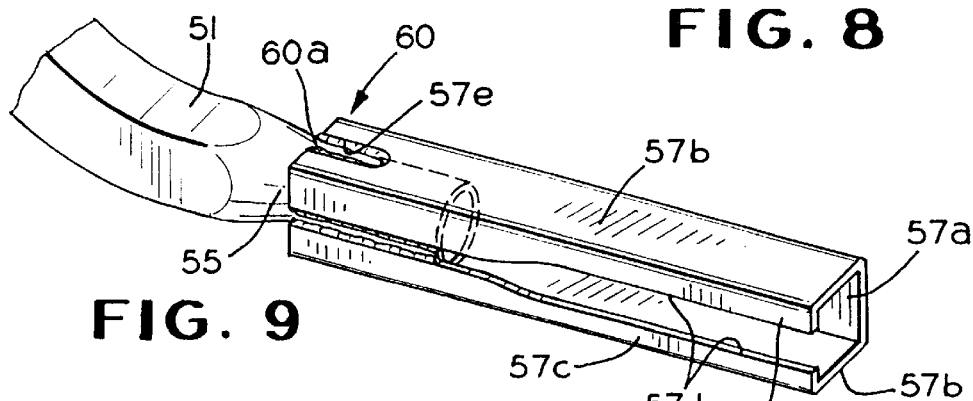
FIG. 9 is an enlarged perspective view of the inside portion of the right joint structure of the vehicle frame assembly illustrated in FIG. 8.
Figure 10:
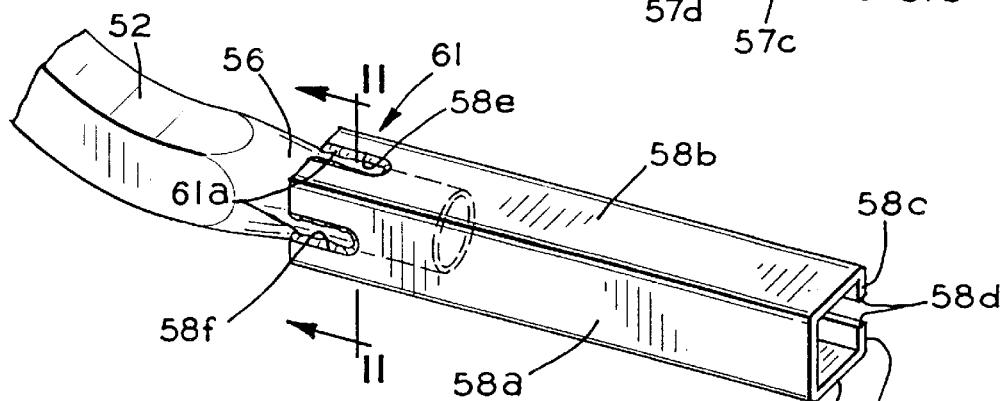
FIG. 10 is an enlarged perspective view of the outside portion of the left joint structure of the vehicle frame assembly illustrated in FIG. 8.
Figure 11:
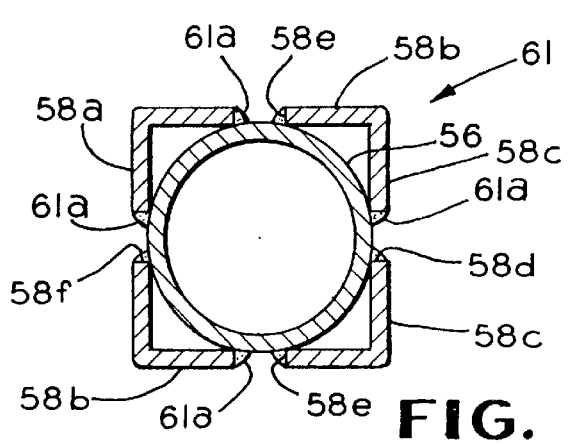
FIG. 11 is a sectional elevational view of the left joint structure taken along line 11—11 of FIG. 10.

The extension members 57 and 58 are secured to the side rails 51 and 52 at respective overlap joints, indicated generally at 60 and 61. As shown in FIG. 9, the right overlap joint 60 is formed by installing the extension member 57 telescopically about the end portion 55 of the side rail 51. When assembled, the vertically extending web portion 57a and the upper and lower horizontally extending flange portions 57b of the extension member 57 are disposed adjacent to the circular end portion 55 of the side rail 51. The lip portions 57c of the extension member 57 are also disposed adjacent to the circular end portion 55 of the side rail 51. The lip portions 57c are wide enough along the overlap joint 60 so that the spaced apart edges 57d thereof are located adjacent the circular outer surface of the end portion 55 of the side rail 51.

Following this initial assembly, the extension member 57 is secured to the side rail 51 in a conventional manner, such as by welding. Welds 60a can be formed along some or all of the adjacent edges of the extension member 57 and the end portion 55 of the side rail 51. Thus, the welds 60a can be formed along the vertically extending web portion 57a (including the non-illustrated notch formed therein), the upper and lower horizontally extending flange portions 57b (including the notches 57e), and the spaced apart edges 57d of the lip portions 57c of the extension member 57. The welds 60a can be formed by any conventional welding apparatus and preferably extend about the entire extent of the extension member 57. However, if desired, the welds 60a need not extend continuously or completely about the entire extent of the adjacent edges of the extension member 57. The overlap joint 61 is similarly formed by installing the extension member 58 telescopically about the side rail 52 and securing the extension member 58 to the side rail 52 by welds 61a. The welds 61a can be formed along some or all of the adjacent edges of the extension member 58.

Figure 12:
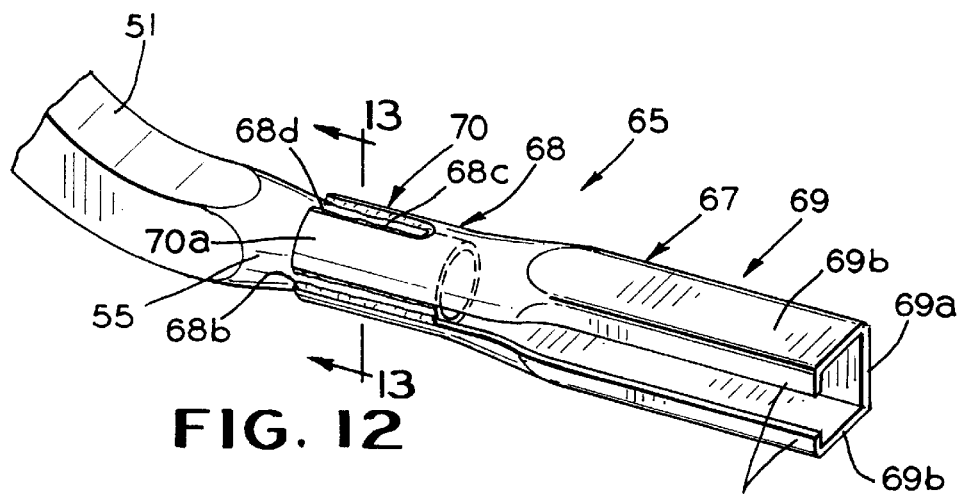
FIG. 12 is an enlarged perspective view of a portion of a vehicle frame assembly including a fourth embodiment of a joint structure between a closed channel side rail member having a circular cross sectional shape and an open channel extension member having a circular cross sectional shape in accordance with this invention.
Figure 13:
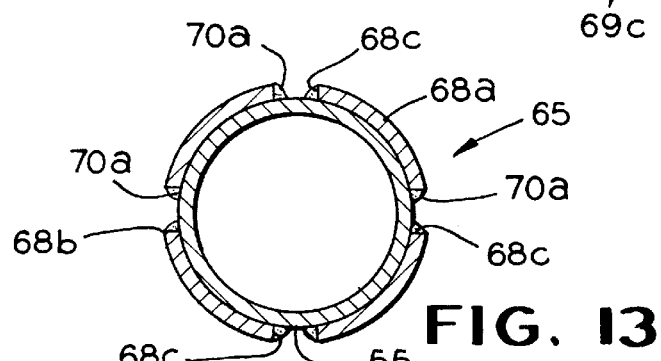
FIG. 13 is a sectional elevational view of the joint structure taken along line 13—13 of FIG. 12.

Referring now to FIGS. 12 and 13, there is illustrated a portion of a vehicle frame assembly, indicated generally at 65, in accordance with a fourth embodiment of this invention. The vehicle frame assembly 65 is similar to the vehicle frame assembly 50 discussed above and includes the side rails 51 and 52 having the respective end portions 55 and 56 of closed, circular cross sectional shape. An extension member, indicated generally at 67, is secured to the end portion 55 of the side rail 51. The illustrated extension member 67 is formed having an open cross sectional shape including a forward portion, indicated generally at 68, having a curved C-shaped cross sectional shape and a rearward portion, indicated generally at 69, having a rectilinear C-shaped cross sectional shape. The forward portion 68 of the extension member 67 is formed having a horizontally extending open-section tubular portion 68a with spaced apart edges 68b. The rearward portion 69 of the extension member 67 is formed having a vertically extending web portion 69a, upper and lower horizontally extending flange portions 69b, and a pair of lip portions 69c which extend vertically inwardly toward one another from the flange portions 69b. A plurality of notches 68c (three in the illustrated embodiment) are formed in the forward edge of the forward portion 68. The notches 68c are generally U-shaped or V-shaped and extend rearwardly from the forward edge of the extension member 67. The entire extension member 67 is preferably first formed having the rectangular C-shaped cross section shaped from a sheet of steel stock using a conventional roll forming process. The circular C-shaped forward portion 68 can then be formed by re-striking the forward portion 68 over a cylindrical mandrel. However, the extension member 67 may be formed from any other acceptable material and manufacturing process.

The extension member 67 is secured to the side rail 51 at an overlap joint, indicated generally at 70. The overlap joint 70 is formed by installing the tubular portion 68a of the extension member 67 telescopically about the end portion 55 of the side rail 51. When assembled, the forward portion 68 of the extension member 67 is disposed parallel to and adjacent the side rail 51 such that the spaced apart edges 68b are adjacent the outer surface of the end portion 55 of the side rail 51. Following this initial assembly, the extension member 67 is secured to the end portion 55 of the side rail 51 in a conventional manner, such as by welding. Welds 70a can be formed along some or all of the adjacent edges of the extension member 67 and the end portion 55 of the side rail 51. Thus, the welds 70a can be formed along the forward edge of the open-section tubular portion 68a, the spaced apart edges 68b, and the notches 68c of the forward portion 68 of the extension member 67. The welds 70a can be formed by any conventional welding apparatus and preferably extend about the entire extent of the extension member 67. However, if desired, the welds 70a need not extend continuously or completely about the entire extent of the extension member 67.

Figure 14:
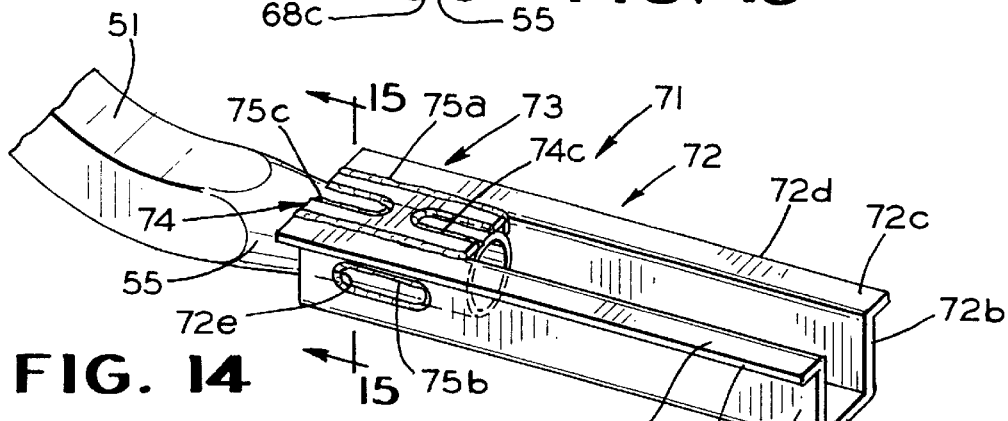
FIG. 14 is an enlarged perspective view of a portion of a vehicle frame assembly including a fifth embodiment of a joint structure between a closed channel side rail member having a circular cross sectional shape and an open channel extension member having a rectilinear cross sectional shape in accordance with this invention.
Figure 15:
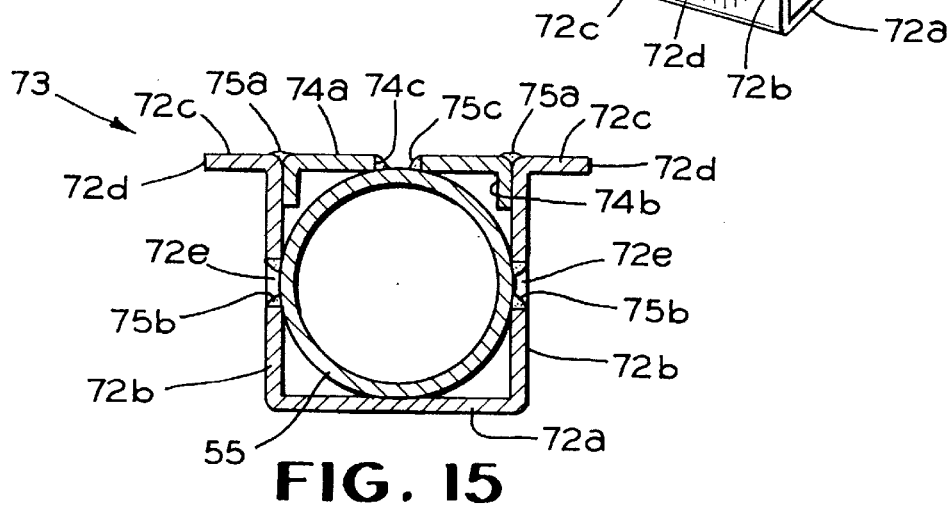
FIG. 15 is a sectional elevational view of the joint structure taken along line 15—15 of FIG. 14.

Referring now to FIGS. 14 and 15, there is illustrated a portion of a vehicle frame assembly, indicated generally at 71, in accordance with a fifth embodiment of this invention. The vehicle frame assembly 71 is similar to the vehicle frame assembly 50 discussed above and includes the side rails 51 and 52 having the respective end portions 55 and 56 of closed, circular cross sectional shape. An extension member, indicated generally at 72, is secured to the end portion 55 of the side rail 51. The illustrated extension member 72 is formed having an open cross sectional shape, such as the illustrated hat-shaped cross sectional shape. The extension member 72 is preferably formed from a sheet of steel stock using a conventional roll forming process. However, the extension member 72 may be formed from any other acceptable material and manufacturing process.

The illustrated hat-shaped extension member 72 is formed having a horizontally extending web portion 72a, a pair of vertically extending flange portions 72b, and a pair of lip portions 72c which extend horizontally outwardly away from one another and from the flange portions 72b. The lip portions 72c terminate in spaced apart edges 72d. An elongated opening 72e is formed in the forward end of each vertically extending flange portion 72b of the extension member 72. Similarly, an elongated opening (not shown) may be formed in the forward end of the vertically extending web portion 72a.

The extension member 72 is secured to the end portion 55 of the side rail 51 at an overlap joint, indicated generally at 73. The overlap joint 73 is formed by installing the extension member 72 telescopically about the end portion 55 of the side rail 51. When assembled, the horizontally extending web portion 72a and the vertically extending flange portions 72b of the extension member 72 are disposed parallel to and adjacent the side rail 51. An H-shaped channel member, indicated generally at 74, extends between the lip portions 72c at the joint 73. As best shown in FIG. 15, the H-shaped channel member 74 is formed having a horizontally extending web portion 74a and a pair of vertically downwardly extending flange portions 74b. The H-shaped channel member 74 is disposed between the lip portions 72c such that the opposed edges of the web portion 74a extend parallel between the lip portions 72c, and the flange portions 72b extend parallel to and adjacent the flanges 72b of the extension member 72. Opposed U-shaped or V-shaped notches 74c are formed in the center of the web portion 74a. The H-shaped channel member 74 is preferably formed from a sheet of steel stock using a conventional stamping process, although other materials and methods of fabrication may be used.

Following this initial assembly, the H-shaped channel member 74 is secured to the extension member 72 by welding. Welds 75a can be formed along some or all of the edges of the web portion 74a of the channel member 74 and the adjacent edges of the lip portions 72c of the extension member 72. The end portion 55 of the side rail 51 is also secured to the extension member 72 and the channel member 74 by welding. Welds 75b can also be formed along some or all of the opening 72e in each flange portion 72b of the extension member 72 and the outer surface of the end portion 55 of the side rail 51. Welds 75c can be formed along some or all of the H-shaped channel notch 74c and the outer surface of the end portion 55 of the side rail 51. The welds 75a, 75b, and 75c can be formed by any conventional welding apparatus and preferably extend about the entire extent of the adjacent edges of the extension member 72 and the channel member 74. However, if desired, the welds 75a, 75b, and 75c need not extend continuously or completely about the entire extent of the adjacent edges.

Figure 16:
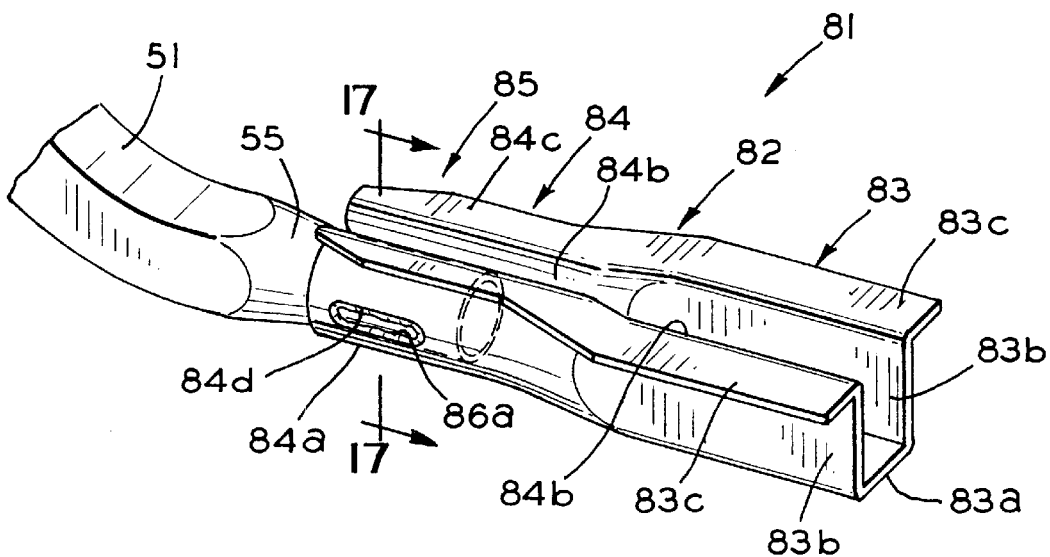
FIG. 16 is an enlarged perspective view of a portion of a vehicle frame assembly including a sixth embodiment of a joint structure between a closed channel side rail member having a circular cross sectional shape and an open channel extension member having a circular cross sectional shape in accordance with this invention.
Figure 17:
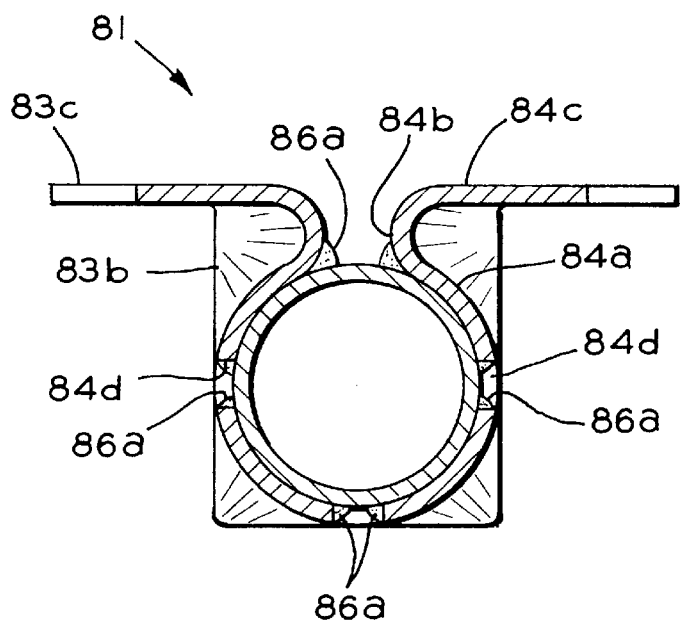
FIG. 17 is a sectional elevational view of the joint structure taken along line 17—17 of FIG. 16.

Referring now to FIGS. 16 and 17, there is illustrated a portion of a vehicle frame assembly, indicated generally at 81, in accordance with a sixth embodiment of this invention. The vehicle frame assembly 81 is similar to the vehicle frame assembly 50 discussed above and includes the side rails 51 and 52 having the respective end portions 55 and 56 of closed, circular cross sectional shape. An extension member, indicated generally at 82, is secured to the end portion 55 of the side rail 51. The illustrated extension member 82 is formed having an open cross sectional shape including a rearward section, indicated generally at 83, having a rectangular hat-shaped cross sectional shape and a forward section, indicated generally at 84, having a circular cross sectional shape.

The illustrated rearward section 83 of the extension member 82 is formed having a horizontally extending web portion 83a, a pair of vertically extending flange portions 83b, and a pair of lip portions 83c which extend horizontally outwardly away from one another and from the flange portions 83b. The illustrated forward section 84 of the extension member 82 is formed having a horizontally extending open-section tubular portion 84a with a C-shaped cross sectional shape terminating at adjacent spaced apart edges 84b and a pair of lip portions 84c which extend horizontally outwardly away from one another and from the spaced apart edges 84b. Three elongated openings or notches 84d are formed in the tubular portion 84a of the extension member 82. The notches 84d are regularly spaced, approximately ninety degrees apart, along the circumference of the open-section tubular portion 84a, although a greater or lesser number of notches may be provided. The entire extension member 82 is preferably first formed having the rectangular hat-shaped cross section shaped from a sheet of steel stock using a conventional roll forming process. The forward section 84 can then be formed by re-striking the forward section 84 over a cylindrical mandrel to form the C-shaped cross section. However, the extension member 82 may be formed from any other acceptable material and manufacturing process. The extension member 82 is secured to end portion 55 of the side rail 51 at an overlap joint, indicated generally at 85. The overlap joint 85 is formed by installing the tubular portion 84a of the extension member 82 telescopically about the end portion 55 of the side rail 51. When assembled, the outer surface of the side rail end portion 55 is disposed parallel to and adjacent the inner surface of the tubular portion 84a of the extension member 82.

Following this initial assembly, the extension member 82 is secured to the end portion 55 of the side rail 51 in a conventional manner, such as by welding. Welds 86a can be formed along some or all of the adjacent edges of the extension member 82 and the end portion 55 of the side rail 51. Thus, the welds 86a can be formed along the notches 84d and the spaced apart edges 84b. The welds 86a can be formed by any conventional welding apparatus and preferably extend about the entire extent of the extension member 82. However, if desired, the welds 86a need not extend continuously or completely about the entire extent of the extension member 82.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A joint for a vehicle frame assembly comprising;

a first vehicle frame member formed having a closed cross sectional shape, said first vehicle frame member terminating in an end portion;

a second vehicle frame member formed having an open cross sectional shape defined by a web portion, first and second flange portions extending from said web portion, and first and second lip portions extending from said first and second flange portions, respectively, said second vehicle frame member terminating in an end portion that is disposed telescopically about said end portion of said first vehicle frame member, said end portion of said second vehicle frame member having a notch formed therein that extends inwardly from an edge thereof; and welds securing said first and second lip portions and said notch of said second vehicle frame member to said first vehicle frame member to form a joint for a vehicle frame assembly.

2. The joint defined in claim 1 wherein said lip portions extend inwardly toward one another to define a generally C-shaped cross sectional shape.

3. The joint defined in claim 1 wherein said lip portions extend outwardly apart from one another to define a generally hat-shaped cross sectional shape.

4. The joint defined in claim 1 wherein said end portion of said second vehicle frame member has a curved edge formed thereon that extends outwardly from an edge thereof, and wherein a weld secures said curved edge of said second vehicle frame member to said first vehicle frame member.

5. The joint defined in claim 1 wherein said end portion of said first vehicle frame member is generally rectilinear in cross sectional shape.

6. The joint defined in claim 1 wherein said end portion of said first vehicle frame member is generally circular in cross sectional shape.

7. A joint for a vehicle frame assembly comprising;

a first vehicle frame member formed having a closed cross sectional shape, said first vehicle frame member terminating in an end portion;

a second vehicle frame member formed having an open cross sectional shape defined by a web portion, first and second flange portions extending from said web portion, and first and second lip portions extending from said first and second flange portions, respectively, said second vehicle frame member terminating in an end portion that is disposed telescopically about said end portion of said first vehicle frame member, said end portion of said second vehicle frame member having a curved edge formed thereon that extends outwardly from an edge thereof; and welds securing said first and second lip portions and said curved edge of said second vehicle frame member to said first vehicle frame member to form a joint for a vehicle frame assembly.

8. The joint defined in claim 7 wherein said lip portions extend inwardly toward one another to define a generally C-shaped cross sectional shape.

9. The joint defined in claim 7 wherein said lip portions extend outwardly apart from one another to define a generally hat-shaped cross sectional shape.

10. The joint defined in claim 7 wherein said end portion of said second vehicle frame member has a notch formed therein that extends inwardly from an edge thereof, and wherein a weld secures said notch of said second vehicle frame member to said first vehicle frame member.

11. The joint defined in claim 7 wherein said end portion of said first vehicle frame member is generally rectilinear in cross sectional shape.

12. The joint defined in claim 7 wherein said end portion of said first vehicle frame member is generally circular in cross sectional shape.

13. A joint for a vehicle frame assembly comprising;

a first vehicle frame member formed having a closed cross sectional shape, said first vehicle frame member terminating in an end portion;

a second vehicle frame member formed having an open cross sectional shape, said second vehicle frame member terminating in a generally circular end portion that is disposed telescopically about said end portion of said first vehicle frame member; and a weld securing said second vehicle frame member to said first vehicle frame member to form a joint for a vehicle frame assembly.

14. The joint defined in claim 13 wherein said end portion of said second vehicle frame member has a notch formed therein, and wherein a weld secures said notch to said first vehicle frame member.

15. The joint defined in claim 14 wherein said notch extends inwardly from an edge of said second vehicle frame member.

16. The joint defined in claim 14 wherein said notch is formed inwardly from an edge of said second vehicle frame member.

17. The joint defined in claim 13 wherein said end portion of said second vehicle frame member defines a generally C-shaped cross sectional shape.

18. The joint defined in claim 13 wherein said end portion of said second vehicle frame member includes a pair of lip portions that extend outwardly apart from one another to define a generally hat-shaped cross sectional shape.

19. The joint defined in claim 13 wherein said first vehicle frame member includes an end portion that is generally circular in cross sectional shape.

* * * * *